J. A. BORLAND.
WHEEL.
APPLICATION FILED DEC. 14, 1912.
1,126,174.
Patented Jan. 26, 1915.
5 SHEETS—SHEET 1.
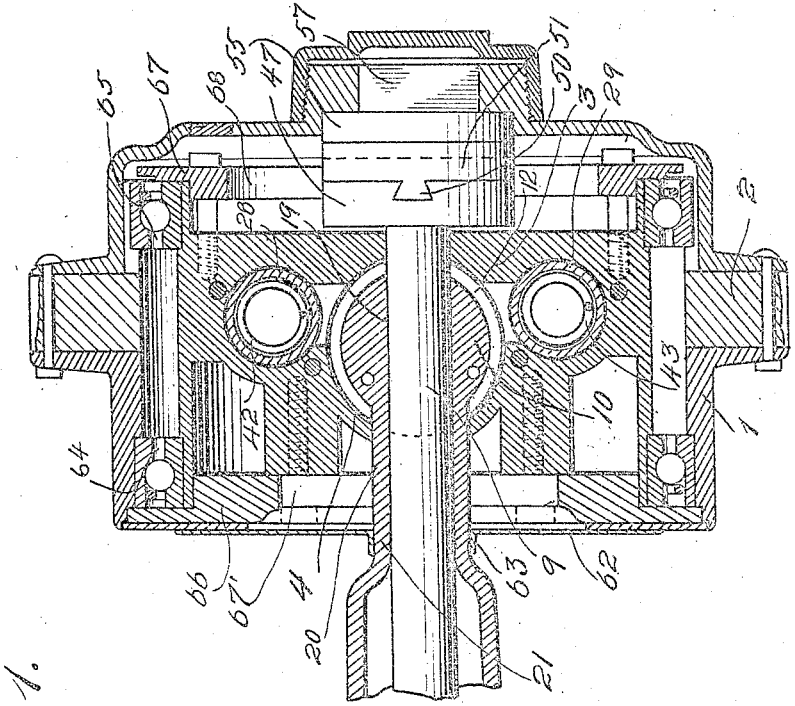
Fig. 1.
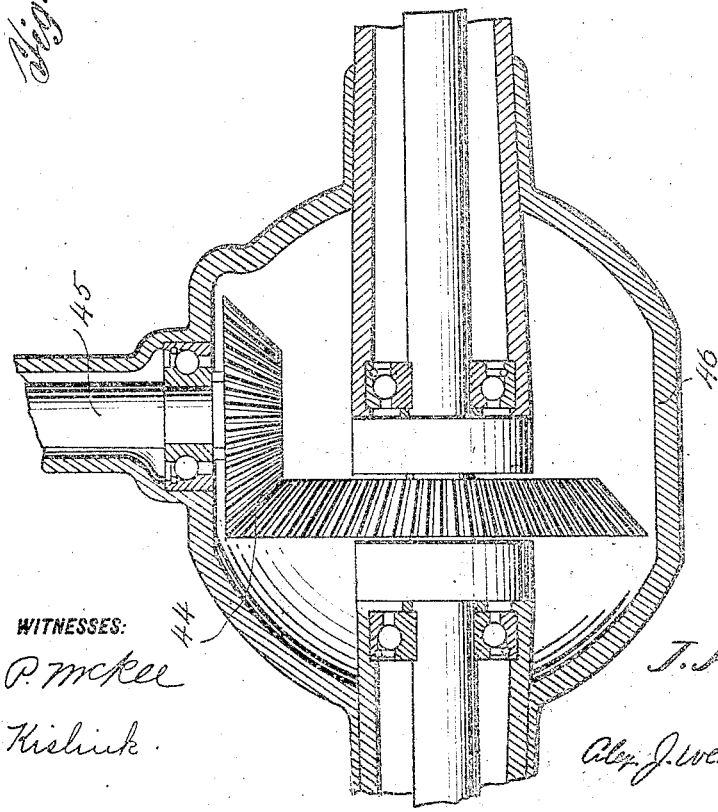
WITNESSES:
M. P. McKee
R. Kislink
INVENTOR
J. A. Borland
BY
Alex. J. Wedderburn, Jr.
ATTORNEY

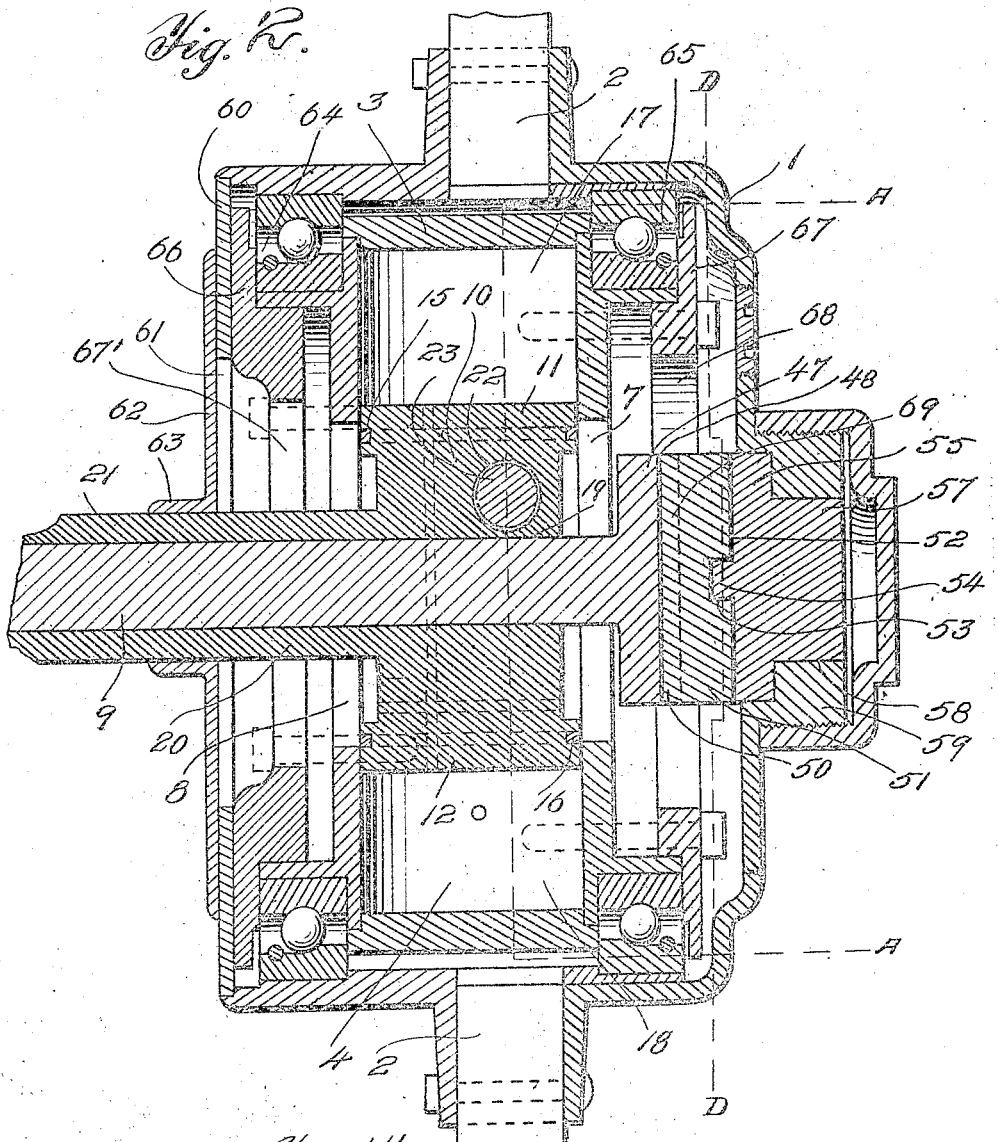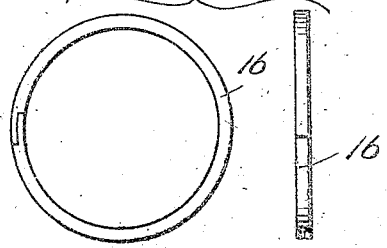

J. A. BORLAND.
WHEEL.
APPLICATION FILED DEC. 14, 1912.
1,126,174.
Patented Jan. 26, 1915.
6 SHEETS—SHEET 3.
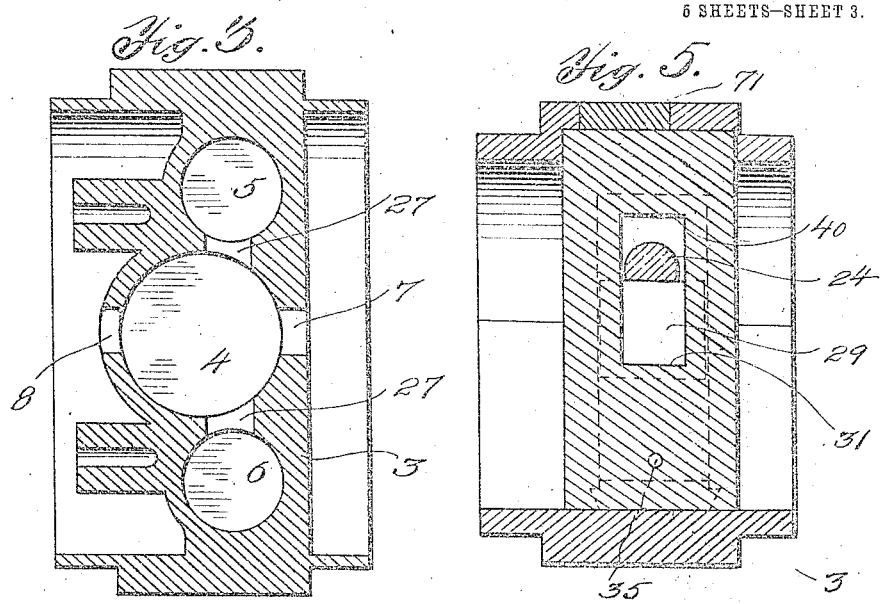
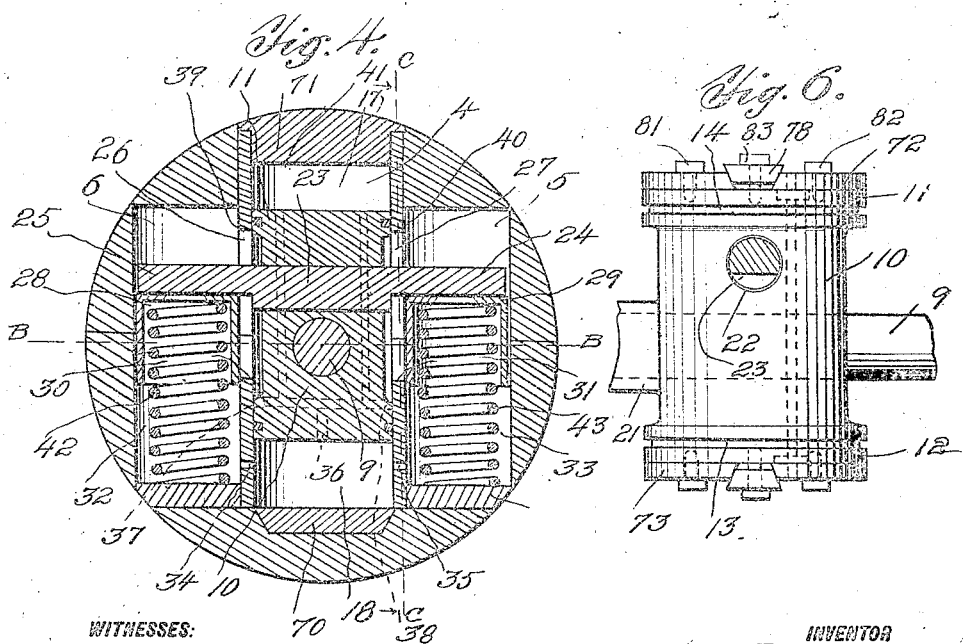
WITNESSES:
M. P. McKee
R. Kislink
INVENTOR
J. A. Borland
BY
Alex. J. Wedderburn, Jr.
ATTORNEY J. A. BORLAND.
WHEEL.
APPLICATION FILED DEC. 14, 1912.
1,126,174.
Patented Jan. 26, 1915.
5 SHEETS—SHEET 4.
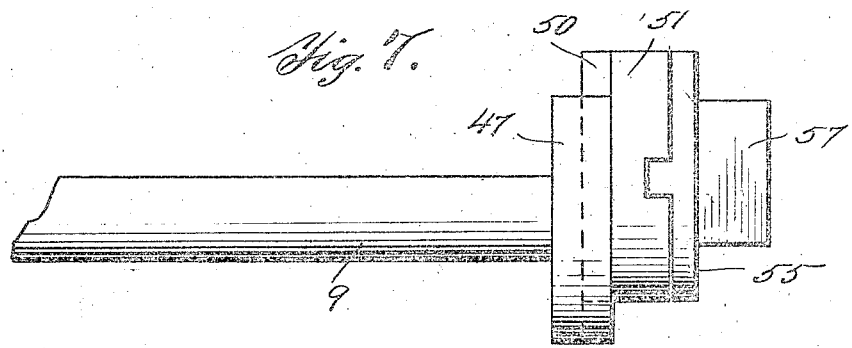
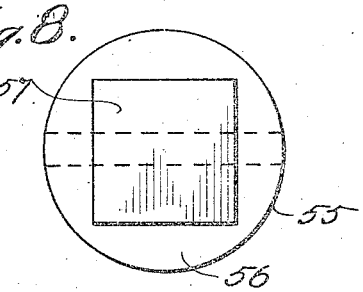
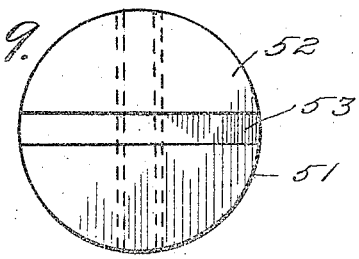
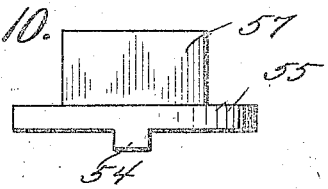
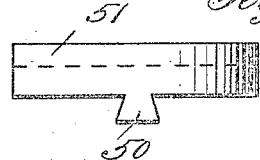
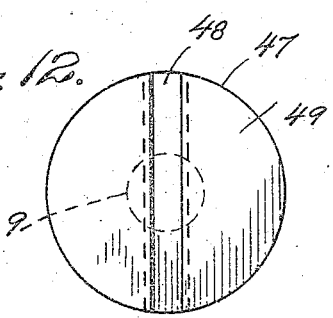
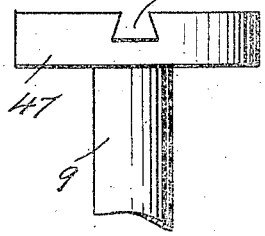
WITNESSES:
M. P. McKee
R. Kislink
INVENTOR
J. A. Borland
BY
Alex J. Wedderburn, Jr.
ATTORNEY

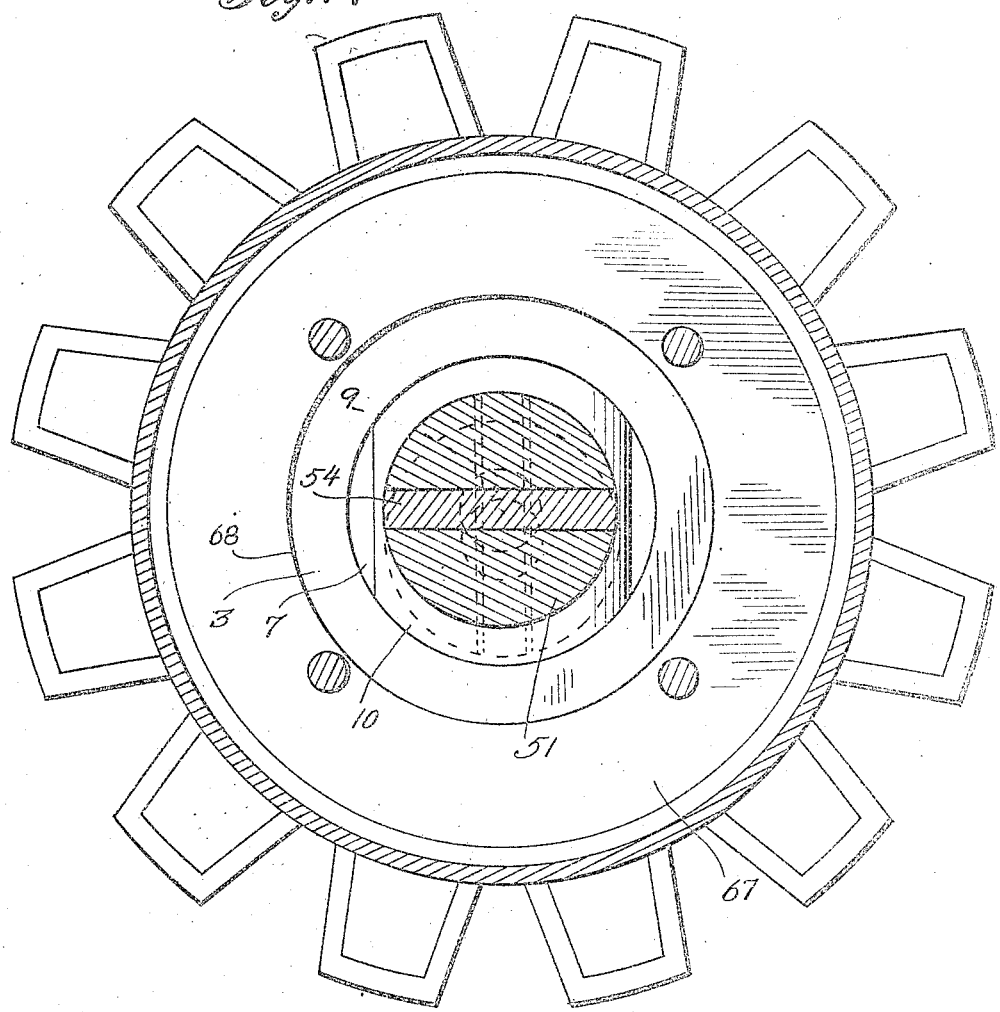
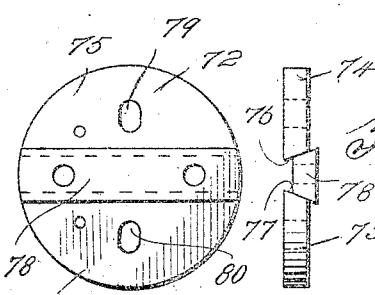

UNITED STATES PATENT OFFICE.

JOHN ARCHIE BORLAND, OF CINCINNATI, OHIO, ASSIGNOR OF ONE-HALF TO POWEL CROSLEY, OF CINCINNATI, OHIO.

WHEEL.

1,126,174. Specification of Letters Patent. Patented Jan. 26, 1915.

Application filed December 14, 1912. Serial No. 736,815.

*To all whom it may concern:*

Be it known that I, JOHN ARCHIE BORLAND, a citizen of the United States, residing at Cincinnati, in the county of Hamilton and State of Ohio, have invented certain new and useful Improvements in Wheels, of which the following is a specification.

This invention relates to improvements in wheels and has for its object to provide a pneumatic wheel whereby an axle may be supported upon air.

Another object of the invention is to provide a wheel having a hollow hub in which an axle may be supported by air pressure, the pressure being produced by means of the axle itself. And another object of the invention is to provide a wheel having a fixed spindle and a rotatable axle therein whereby the wheel may be driven.

Still another object of the invention is to provide a wheel having a rotatable hub and a fixed spindle around which said hub rotates, said spindle arranged to support an axle rotatable therein by means of which said hub is rotated. And another object of the invention is to provide a wheel having a floating spindle, a hub rotatable therearound, an axle rotatable in said spindle and secured to said hub whereby the hub is rotated.

Heretofore it has been considered an impossibility to drive a wheel by means of an axle supported in nonrotatable spindles in the wheel driven, however it will be seen from the following specification that I have solved this problem and produced a construction that is absolutely practical and satisfactory from every standpoint.

I am aware that pneumatically supported axles have been patented heretofore, but they have all proved failures for the very plain reason that the air has been compressed from a source outside of the wheel hub itself whereby the pressure has to be regulated regardless of the load it has to sustain, consequently this method has proved as impractical as the spring supported axles.

I have overcome the above explained difficulties by providing a fixed hub having a floating spindle thereon in which an axle is rotatably mounted, with means provided within the hub, whereby air is compressed, as required to normally, or under any emergency, support said spindle in an approximately uniform plane.

An object of the invention not heretofore mentioned is to provide means whereby a too sudden rebound of the wheel may be prevented after a sudden shock.

With the above and other objects in view which will be more fully pointed out in the following specification I have invented the device illustrated in the accompanying drawings in which—

Figure 1 is a horizontal sectional view through my device, certain parts being shown in elevation, Fig. 2 is a vertical sectional view therethrough, Fig. 3 is a sectional view taken on line B—B of Fig. 4, the axle supporting members being removed, Fig. 4 is a reduced sectional view taken on line A—A of Fig. 2, Fig. 5 is a section taken on line C—C of Fig. 4, Fig. 6 is a detail elevational view of a spindle, Fig. 7 is a detail elevational view of an axle and universal connection between said axle and a wheel, Fig. 8 is an end elevational view of an outer connecting member, Fig. 9 is an elevational view of an intermediate connecting disk, Fig. 10 is a side elevational view of Fig. 8, Fig. 11 is an edge view of the disk shown in Fig. 9, Fig. 12 is an end elevational view of an axle, Fig. 13 is a side view thereof, Fig. 14 shows a plan and edge view of an expansive packing ring, Fig. 15 is a top plan view of a centering member, Fig. 16 is an edge view thereof, and Fig. 17 is a section on line D—D of Fig. 2.

Like reference characters indicate like parts throughout the specification and in the several views in the drawings in which—

1 designates a revolving hub of a wheel and 2 indicates the spokes of said wheel. Mounted in the hub 1 is a stationary hub or spindle box 3 which is provided with three vertical cylindrical bores 4, 5 and 6, the bore 4 being in the center and of a diameter larger than that of the bores 5 and 6. The bore 4 is provided with opposing vertically disposed longitudinal centrally disposed slots 7 and 8 to permit of the vertical movement of said box relative to the axle 9 which projects through said slots, reference to Figs. 3 and 4 in particular being had to determine the arrangement of said box.

Vertically movable and suspended upon air in the bore 4 is a cylindrical spindle head 10 having enlarged ends 11 and 12 provided with annular grooves 13 and 14 in which seat the expansion packing rings 15 and 16, said heads fitting against the walls of the cylindrical bore 4 so snugly that escape of air from the pockets 17 or 18 at the opposing ends of the bore is prevented. A passage 19 is provided through the central portion of the spindle 10 to permit of the seating of the axle 9 thereon. A bushing (not shown) may be provided in said passage 19 for the axle if desired. A spindle sleeve 20 incases the axle 9 and the neck portion 21 thereof projects through the slot 8 and is fixed to the spindle head 21.

A passage 22 extends through the spindle head 10, transverse of the passage 19 and nearer the upper end 11 thereof and a cross arm 23 having ends 24 and 25 which are flattened on their under side, projects through said passage 22 on through the slots 26 and 27 into the bores 5 and 6 and seat upon the inverted pistons 28 and 29 the lower edges of which normally project slightly below the lower walls 30 and 31 of the slots 26 and 27 whereby air is held against escape from the pockets 32 and 33. It will readily be seen that a reciprocating movement of the cups 28 and 29 caused by the jolting of a vehicle upon which said wheels are used will cause air to be trapped into the pockets 32 and 33, the air being taken in when the lower edges of the cups are above the walls 30 and 31 whereby said pistons assist in suspending said head which will at all times be held resiliently suspended regardless of the weight upon the axle, the pistons acting to produce a proper amount of air pressure which together with the air compressed under the spindle head will hold it suspended on an approximately uniform plane under any conditions or emergencies. The head 10 is provided with a small air passage 36 (shown in dotted lines in Fig. 4) whereby air may be sucked into the pocket 18 from the openings 26 and 27 whenever the inlets 37 and 38 of said air passage project above the walls 30 and 31, so that a sudden movement of the wheel relative to the head 10 will permit of an adequate amount of air being supplied under the head on its downward movement to break any shock whatsoever.

Above the upper walls 39 and 40 of the slots 5 and 6 is provided the pockets 17 and when the end of the head 10 projects above said last named walls air is compressed in said pocket which acts as a cushion to prevent said end from hammering against the upper wall 41 of said bore 4 thereby preventing any shock from such a relative movement of the wheel and spindle.

The coil springs 42 and 43 seated under the pistons 28 and 29 are for the purpose of holding the spindle 10 suspended when the vehicle upon which the wheels are used are at a standstill and with only a nominal weight therein and before movement of the vehicle has caused a supply of air to be pumped under the spindle. These springs are also for the additional purpose of quickly assisting the compressed air to cause the wheel and spindle to find the normal relative position after a shock, and with their use it is not necessary to have the spindle head and valve cups fit as closely to the walls of the bores 4, 5 and 6 as without their use would be necessary.

It has above been explained that the axle 9 is rotatable and it is rotated as shown in the drawings in this case (see Fig. 1) by means of a bevel gearing 44 operated by an engine shaft 45, the said gearing being covered by the hood 46. The outer end of the axle 9 is provided with a disk 47 having a slot 48 across its face 49 in which is slidable a tongue 50 of a disk 51 which has provided in its face 52 opposing the face with the tongue 50, a groove 53 running transverse of said tongue 51, in which is slidable a tongue 54 on the disk 55 which separates transversely of the tongue 50. The disk 55 has provided on its outer surface 56 a projecting rectangular head 57 which fits into the rectangular socket 58 in the face plate 59 which in turn is fixed to the revolving hub 1. The members 47, 51 and 55 with their slidable tongue and groove connections form a universally movable connection between the axle and the wheel whereby the latter may be rotated by the axle regardless of their relative positions, the axle at all times being rigidly fixed to the rotatable hub 1. The pistons 28 and 29 are formed cup-shaped in order that a greater amount of air may be pocketed under the arms 24 and 25.

The spindle 10 is provided on its opposing ends with centering members 72 and 73 for the purpose of holding said spindle absolutely vertical in the bore 4 at all times. Each of these centering members consists of a pair of semicylindrical plates 74 and 75 having their inner edges 76 and 77 beveled to receive the wedge 78, the members 74 and 75 are each provided with longitudinal slots 79 and 80 through which project screws 81 and 82, whereby they are held to the member 10 and the wedge 78 is seated between the members 74 and 75 and fixed to the member 10 by means of a screw 83. Whenever the enlarged ends 11 and 12 of the member 10 wear sufficiently to permit of an undue amount of leakage or permit of any sidewise motion of the member 10, all that is necessary to do is to slightly loosen up the screws 81 and 82 and tighten the screw 83 whereby the wedge is driven down between the members 81 and 82 forcing them apart equally from the center.

The box 3 is provided with a rear plate 60 having a slot 61 through which the spindle sleeve 20 and axle project, and a dust guard 62 having a collar 63 is mounted on the sleeve part 21. The box 3 and hub 1 are connected by ball races 64, and 65, and plates 66 and 67 are adapted to hold said races in place. The plate 66 is provided with an opening 67' for the passage and operation of the axle and spindle sleeve and the plate 67 is provided with a circular opening 68 sufficiently large in diameter to permit of the proper movement of the universal connection 69. Rubber cushions 70 and 71 may be provided in the opposing ends of the bore 4 if desired in order to break any jolt should the spindle head 10 by any means come in contact with the ends of said bore 4.

Having now described my invention I wish it to be understood that I do not limit myself to the exact construction disclosed in the drawings, but only to the extent of the scope of the following claims which I desire to procure by Letters Patent.

I claim—

1. The described device consisting of a wheel having a spindle box therein, a plurality of bores in said box, a floating spindle head in one of said bores, arms projecting from said head into the other of said bores, pistons on said arms, said head and pistons adapted to be suspended by air compressed entirely within said bores.

2. The described device consisting of a wheel having a spindle box therein, a plurality of bores in said box, a floating spindle head in one of said bores, arms projecting from said head into the other of said bores, pistons on said arms, said head and pistons adapted to be suspended by air compressed entirely within said bores, springs under said pistons.

3. The described device consisting of a wheel having a spindle box therein, a plurality of bores in said box, a floating spindle head in one of said bores, arms projecting from said head into the other of said bores, pistons on said arms, said head and pistons adapted to be suspended by air compressed entirely within said bores, springs under said pistons, and an axle rotatably mounted in said head.

4. The described device consisting of a wheel having a spindle box therein, a plurality of bores in said box, a floating spindle head in one of said bores, arms projecting from said head into the other of said bores, pistons on said arms, said head and pistons adapted to be suspended by air compressed entirely within said bores, springs under said pistons, and an axle rotatably mounted in said head, said bores having openings therein just above the normal position of the lower ends of the pistons, whereby air will be admitted into said bores when said pistons are forced above their normal positions.

5. The described device consisting of a wheel having a spindle box therein, a plurality of bores in said box, a floating spindle head in one of said bores, arms projecting from said head into the other of said bores, pistons on said arms, said head and pistons adapted to be suspended by air compressed entirely within said bores, springs under said pistons, and an axle rotatably mounted in said head, said bores having openings therein just above the normal position of the lower ends of the pistons, whereby air will be admitted into said bores when said pistons are forced above their normal positions, and means on both ends of said head whereby said spindle and pistons are held vertically disposed in said bores.

6. The described device consisting of a wheel having a spindle box therein, a plurality of bores in said box, a floating spindle head in one of said bores, arms projecting from said head into the other of said bores, pistons on said arms, said head and pistons adapted to be suspended by air compressed entirely within said bores, springs under said pistons, and an axle rotatably mounted in said head, and means on said head whereby said spindle and pistons are held vertically disposed, said means consisting of expansible disks.

7. The described wheel having a rotatable hub, a cylindrically formed box around which said hub rotates, a plurality of bores in said box, a pneumatically suspended spindle head in said box and an axle mounted in said head, said bores being connected by openings in the walls thereof.

8. The described wheel having a rotatable hub, a cylindrically formed box around which said hub rotates, a plurality of bores in said box, a pneumatically suspended spindle head in said box and an axle mounted in said head, said bores being connected by openings in the walls thereof, and arms projecting from said head into each of the outer of said bores.

9. The described wheel having a rotatable hub, a cylindrically formed box around which said hub rotates, a plurality of bores in said box, a pneumatically suspended spindle head in said box, and an axle mounted in said head, said bores being connected by openings in the walls thereof, and arms projecting from said head into each of the outer of said bores, pistons carried by said arms, said pistons adapted to compress air in said bores.

10. The described wheel having a rotatable hub, a cylindrically formed box around which said hub rotates, a plurality of bores in said box, a pneumatically suspended spindle head in said box, and an axle mounted in said head, said bores being connected by openings in the walls thereof, and arms projecting from said head into each of the outer of said bores, pistons carried by said arms, said pistons adapted to compress air in said bores, and means whereby said pistons are resiliently suspended.

11. The described wheel having a rotatable hub, a cylindrically formed box around which said hub rotates, a plurality of bores in said box, a pneumatically suspended spindle head in said box, and an axle mounted in said head, said bores being connected by openings in the walls thereof, and arms projecting from said head into each of the outer of said bores, pistons carried by said arms, said pistons adapted to compress air in said bores, and means whereby said pistons are resiliently suspended, said pistons consisting of inverted cups, springs projecting into said cups.

12. The described wheel having a rotatable hub, a cylindrically formed box around which said hub rotates, a plurality of bores in said box, a pneumatically suspended spindle head in said box, and an axle mounted in said head, said bores being connected by openings in the walls thereof, and arms projecting from said head into each of the outer of said bores, pistons carried by said arms, said pistons adapted to compress air in said bores, and means whereby said pistons are resiliently suspended, said pistons consisting of inverted cups, springs projecting into said cups, said pistons adapted to suck air through said openings and compress it below said openings whereby they are held suspended.

13. The described wheel having a rotatable hub, a cylindrically formed box around which said hub rotates, a plurality of bores in said box, a pneumatically suspended spindle head in said box, and an axle mounted in said head, said bores being connected by openings in the walls thereof, and arms projecting from said head into each of the outer of said bores, pistons carried by said arms, said pistons adapted to compress air in said bores, and means whereby said pistons are resiliently suspended, said pistons consisting of inverted cups, springs projecting into said cups, said pistons adapted to suck air through said openings and compress it below said openings whereby they are held suspended, said bores being connected by openings smaller than said first openings, said latter openings being near the bottoms of said bores.

In testimony whereof I affix my signature in presence of two witnesses.

JOHN ARCHIE BORLAND.

Witnesses:
ANNA BORLAND,
GEORGE C. SCHMITT, Jr.